(12) United States Patent
Aihara

(10) Patent No.: US 8,335,019 B2
(45) Date of Patent: Dec. 18, 2012

(54) IMAGE FORMATION APPARATUS, COLOR CONVERSION PROGRAM EMBODIED ON COMPUTER READABLE MEDIUM, AND COLOR CONVERSION METHOD

(75) Inventor: Nobuhiro Aihara, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 542 days.

(21) Appl. No.: 12/645,089

(22) Filed: Dec. 22, 2009

(65) Prior Publication Data

US 2010/0165412 A1 Jul. 1, 2010

(30) Foreign Application Priority Data

Dec. 26, 2008 (JP) ................. 2008-333516

(51) Int. Cl.
- H04N 1/40 (2006.01)
- G03F 3/08 (2006.01)
- G06K 9/00 (2006.01)

(52) U.S. Cl. ........ 358/3.23; 358/518; 382/162; 382/167
(58) Field of Classification Search .................. 358/3.23, 358/518; 382/162, 167
See application file for complete search history.

(56) References Cited

U.S. PATENT DOCUMENTS

| 7,336,392 B2* | 2/2008 | Kakutani | 358/1.9 |
| 2006/0114528 A1 | 6/2006 | Ito | |
| 2007/0285694 A1* | 12/2007 | Horita | 358/1.9 |

FOREIGN PATENT DOCUMENTS

| GB | 1 595 122 | 8/1981 |
| JP | 58-16180 B2 | 3/1983 |
| JP | 02-087192 | 3/1990 |
| JP | 10-307911 A | 11/1998 |
| JP | 2000-270232 | 9/2000 |
| JP | 2006-157252 | 6/2006 |
| JP | 2007-174392 | 7/2007 |

OTHER PUBLICATIONS

Office Action (Notice of Ground of Rejection) dated Jan. 11, 2011, issued in the corresponding Japanese Patent Application No. 2008-333516, and an English Translation thereof.

* cited by examiner

Primary Examiner — Charlotte M Baker
(74) Attorney, Agent, or Firm — Buchanan Ingersoll & Rooney PC

(57) ABSTRACT

In order to accelerate the processing speed using existing hardware or program, MFP sets a reference lattice point in the device space of a printer (S05), calculates the difference between first color data and the reference lattice point (S06), sets the dimension having the largest difference of the differences of dimensions not set as process targets, as a process target dimension (S10), sets the lattice point having the process target dimension as a second process target lattice point (S11), calculates a base term based on the difference of the process target dimension, the first process target lattice point, and the second process target lattice point (S18), calculates a total sum vector (S19), resets the second process target lattice point as a first process target lattice point every time the base term is calculated (S20), calculates a second reference vector using an existing triangular pyramid interpolation expression when the number of dimensions not set as process target dimensions become three (S14), and determines second color data from the total sum vector and the second reference vector.

12 Claims, 5 Drawing Sheets

F I G. 3
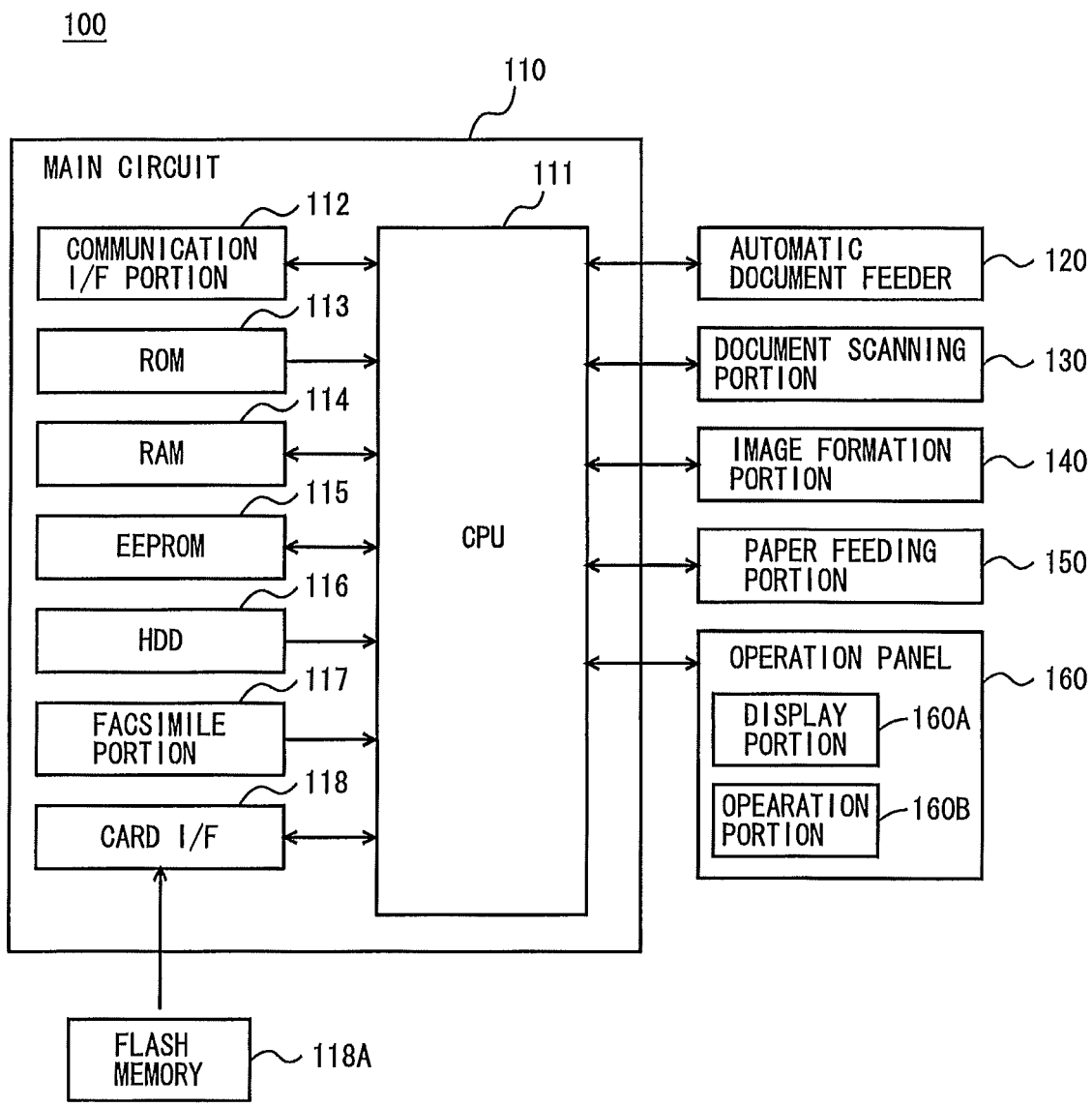

F I G. 5
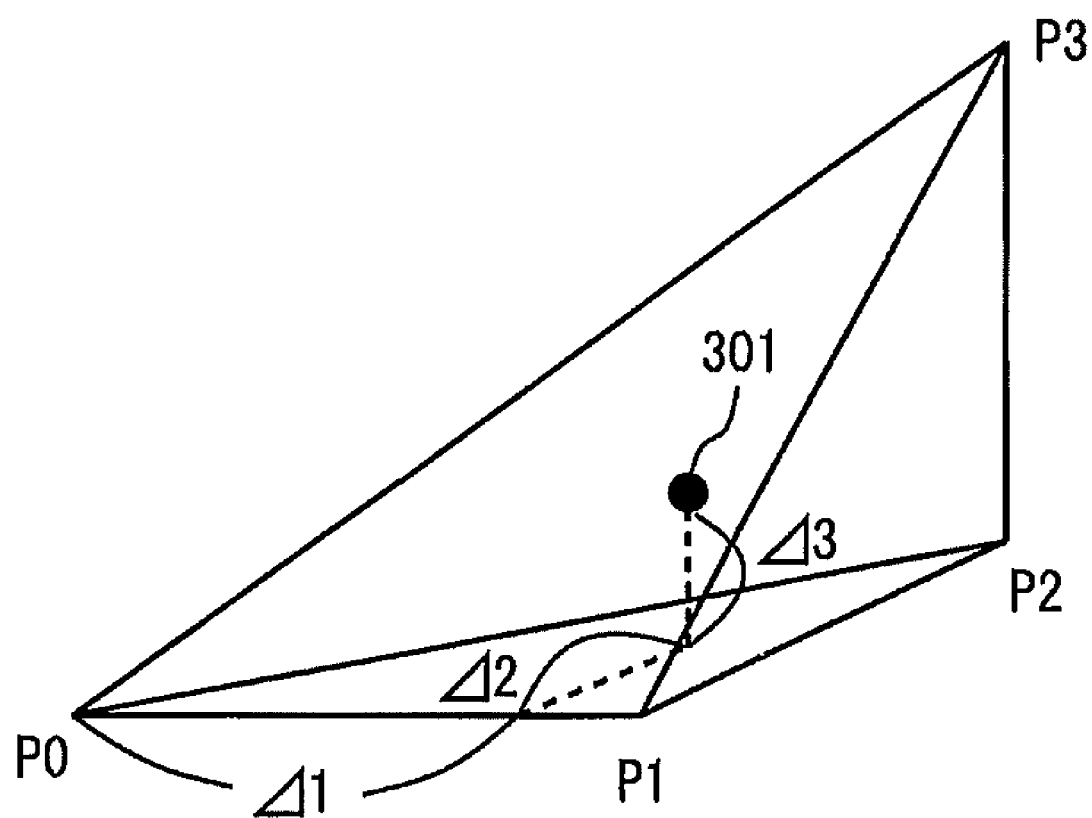

IMAGE FORMATION APPARATUS, COLOR CONVERSION PROGRAM EMBODIED ON COMPUTER READABLE MEDIUM, AND COLOR CONVERSION METHOD

This application is based on Japanese Patent Application No. 2008-333516 filed with Japan Patent Office on Dec. 26, 2008, the entire content of which is hereby incorporated by reference.

BACKGROUND OF THE INVENTION

1. Field of the Invention

The present invention relates to an image formation apparatus, a color conversion program embodied on a computer readable medium, and a color conversion method, and more particularly to an image formation apparatus converting data generated to be printed on a first printer into data to be printed on a second printer, a color conversion program embodied on a computer readable medium to be executed in the image formation apparatus, and a color conversion method.

2. Description of the Related Art

The color management system is known as a technique for adapting to differences in color reproducibility among different devices. The ICC (International Color Consortium) profile, which describes color-related characteristics for each device, is used in the color management system. A color conversion lookup table is generated using the ICC profile of an input device and the ICC profile of an output device thereby to facilitate conversion from color data for output on the input device into color data for output on the output device.

In the color conversion lookup table, in order to relate a predetermined plurality of lattice points in a device space (color system) of an input device with a predetermined plurality of lattice points in a device space of an output device, output data converted for the output device using the color conversion lookup table should be interpolated in a case where first color data generated for the input device is located between a plurality of lattice points. Japanese Examined Patent Publication No. 58-16180 discloses a method of color conversion using four lattice points that constitute the vertexes of a triangular pyramid enclosing a pixel of color data to be subjected to color conversion, among a plurality of lattice points in a device space of an input device as defined by a three-dimensional lookup table. The conventional color conversion method can be applied not only to a case where color data is three-dimensional but also to a case where it is N-dimensional (where N is an integer equal to or larger than four).

On the other hand, the color space for use in image data is generally a three-dimensional device space in RGB color system. Therefore, an output device is installed with existing hardware or program for operating the above-noted interpolation when color data is converted from the three-dimensional device space into the device space of the output device. The existing hardware or program is hardware or a program for executing an interpolation process for relatively low dimensions, for example, as in the expression (8) shown later.

However, when the device space of color data is not three-dimensional, the conventional color conversion method has to be used, and the existing hardware or program that the device originally has cannot be used.

Furthermore, Japanese Patent Laid-Open No. 10-307911 discloses a technique for determining a lattice point to be interpolated in three-dimensional interpolation and a weight coefficient in the interpolation operation by sorting lower-order bits of input data in descending order. However, when the technique disclosed in Japanese Patent Laid-Open No. 10-307911 is applied to input data having dimensions larger than three dimensions, the number of times operations are performed is increased due to the sorting processing, thereby increasing the processing time.

SUMMARY OF THE INVENTION

The present invention is made in order to solve the aforementioned problems. An object of the present invention is to provide an image formation apparatus to allow acceleration of the processing speed with a reduced number of operations with the use of existing hardware or program.

Another object of the present invention is to provide a color conversion program embodied on a computer readable medium and a color conversion method to allow acceleration of the processing speed with a reduced number of operations with the use of existing hardware or program.

In order to achieve the aforementioned object, in accordance with an aspect of the present invention, an image formation apparatus includes: a storage portion to store a lookup table for converting first color data in a first color space having M dimensions (M is a positive integer) into second color data in a second color space having N dimensions (N is a positive integer); a reference lattice point setting portion to set, as a reference lattice point, a lattice point where M elements are each equal to or smaller than M elements of the first color data, of a plurality of lattice points in the first color space defined by the lookup table; a difference calculation portion to calculate, for each of M elements of the first color data, a difference from an element of a corresponding dimension of the reference lattice point, and to output a difference for each of M dimensions; a first setting portion to set the reference lattice point as a first process target lattice point; a process target dimension setting portion to set, as a process target dimension, a dimension having a largest difference of differences of dimensions not set as process targets of M dimensions; a second setting portion to set, as a second process target lattice point, a lattice point where an element of a dimension other than the process target dimension is equal to the first process target lattice point and the element of the process target dimension is larger than the first process target lattice point, of a plurality of lattice points in the first color space defined by the lookup table; a base term calculation portion to calculate a partial vector in the second color space, based on the difference of the process target dimension, the first process target lattice point, and the second process target lattice point; a resetting portion to reset the second process target lattice point as the first process target lattice point until a predetermined number (M−L) (L is a positive integer) of the partial vectors are calculated; a total sum vector calculation portion to calculate a total sum vector by adding up the partial vectors every time the partial vector is calculated; a reference vector calculation portion to calculate a second reference vector in the second color space corresponding to a first reference vector determined by a predetermined operational expression, using the lookup table, based on the second process target lattice point, differences of L dimensions, and L lattice points determined by the differences of L dimensions, after the process target dimension is set until the number of dimensions not set as the process target dimension by the process target dimension setting portion becomes L, and the second process target lattice point corresponding to a dimension set as the (M−L)th process target dimension by the second setting portion is set; and a conversion portion to calculate the second color data by adding the reference vector and a sum of the total sum vectors.

In accordance with another aspect of the present invention, a color conversion program embodied on a computer readable medium allows an image formation apparatus to execute the steps of: storing a lookup table for converting first color data in a first color space having M dimensions (M is a positive integer) into second color data in a second color space having N dimensions (N is a positive integer); setting, as a reference lattice point, a lattice point where M elements are each equal to or smaller than M elements of the first color data, of a plurality of lattice points in the first color space defined by the lookup table; calculating, for each of M elements of the first color data, a difference from an element of a corresponding dimension of the reference lattice point, and outputting a difference for each of M dimensions; setting the reference lattice point as a first process target lattice point; setting, as a process target dimension, a dimension having a largest difference of differences of dimensions not set as process targets of M dimensions; setting, as a second process target lattice point, a lattice point where an element of a dimension other than the process target dimension is equal to the first process target lattice point and an element of the process target dimension is larger than the first process target lattice point, of a plurality of lattice points in the first color space defined by the lookup table; calculating a partial vector in the second color space, based on the difference of the process target dimension, the first process target lattice point, and the second process target lattice point; resetting the second process target lattice point as the first process target lattice point until a predetermined number (M−L) (L is a positive integer) of the partial vectors are calculated; calculating a total sum vector by adding up the partial vectors every time the partial vector is calculated; calculating a second reference vector in the second color space corresponding to a first reference vector determined by a predetermined operational expression, using the lookup table, based on the second process target lattice point, differences of L dimensions, and L lattice points determined by the differences of L dimensions, after the process target dimension is set until the number of dimensions not set as the process target dimension becomes L, and the second process target lattice point corresponding to a dimension set as the (M−L)th process target dimension is set; and calculating the second color data by adding the reference vector and a sum of the total sum vectors.

In accordance with a further aspect of the present invention, a color conversion method includes the steps of storing a lookup table for converting first color data in a first color space having M dimensions (M is a positive integer) into second color data in a second color space having N dimensions (N is a positive integer); setting, as a reference lattice point, a lattice point where M elements are each equal to or smaller than M elements of the first color data, of a plurality of lattice points in the first color space defined by the lookup table; calculating, for each of M elements of the first color data, a difference from an element of a corresponding dimension of the reference lattice point and outputting a difference for each of M dimensions; setting the reference lattice point as a first process target lattice point; setting, as a process target dimension, a dimension having a largest difference of differences of dimensions not set as process targets of M dimensions; setting, as a second process target lattice point, a lattice point where an element of a dimension other than the process target dimension is equal to the first process target lattice point and an element of the process target dimension is larger than the first process target lattice point, of a plurality of lattice points in the first color space defined by the lookup table; calculating a partial vector in the second color space, based on the difference of the process target dimension, the first process target lattice point, and the second process target lattice point; resetting the second process target lattice point as the first process target lattice point until a predetermined number (M−L) (L is a positive integer) of the partial vectors are calculated; calculating a total sum vector by adding up the partial vectors every time the partial vector is calculated; calculating a second reference vector in the second color space corresponding to a first reference vector determined by a predetermined operational expression, using the lookup table, based on the second process target lattice point, differences of L dimensions, and L lattice points determined by the differences of L dimensions, after the process target dimension is set until the number of dimensions not set as the process target dimension becomes L, and the second process target lattice point corresponding to a dimension set as the (M−L)th process target dimension is set; and calculating the second color data by adding the reference vector and a sum of the total sum vectors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing an exemplary hardware configuration of MFP.

FIG. 5 shows the relation between first color data and lattice points in a device space of a printer.

DESCRIPTION OF THE PREFERRED EMBODIMENTS

Figure 1:
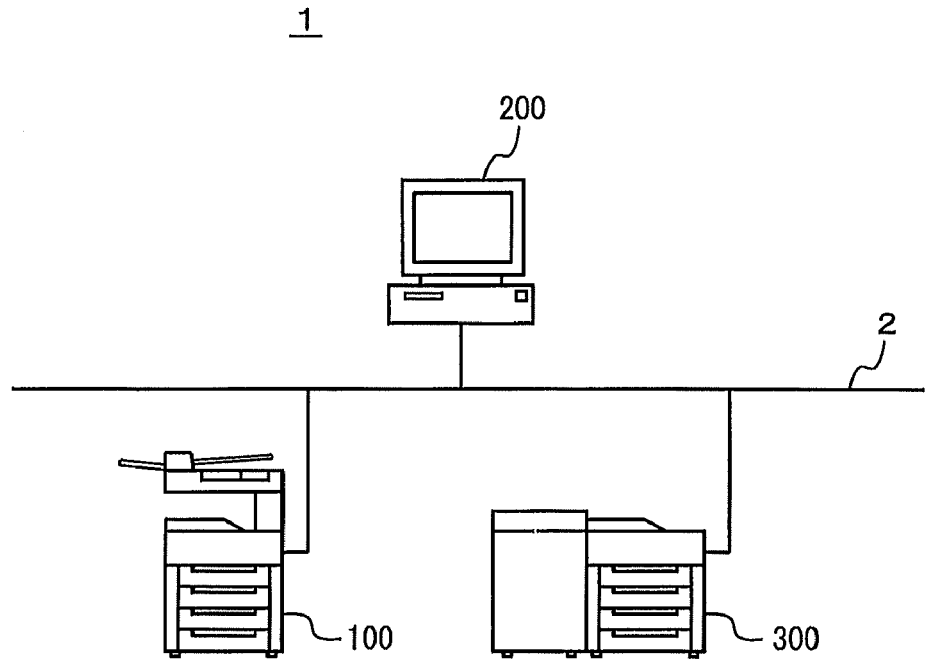
FIG. 1 is a diagram showing an overview of an image processing system in an embodiment of the present invention.

In the following, an embodiment of the present invention will be described with reference to the figures. In the following description, the same parts are denoted with the same reference characters. Their names and functions are also the same. Therefore, a detailed description thereof will not be repeated.

FIG. 1 is a diagram showing an overview of an image processing system in an embodiment of the present invention. Referring to FIG. 1, an image processing system 1 includes an MFP (Multi Function Peripheral) 100 functioning as an image processing apparatus, a printer 300 specifically designed for printing, and a personal computer (referred to as "PC" hereinafter) 200 controlling each of MFP 100 and printer 300, each being connected to a network 2.

Network 2 is a Local Area Network (LAN) and is connected to the Internet through a gateway. Network 2 is connected via either wired or wireless. Network 2 is not limited to LAN and may be a network using a Public Switched Telephone Network, a Wide Area Network (WAN), or the Internet.

Printer 300 is an image formation apparatus capable of printing using six colors, namely, cyan (C), magenta (M), yellow (Y), black (K), orange (O), and green (G). MFP 100 is an image formation apparatus capable of printing using four colors, namely, cyan (C), magenta (M), yellow (Y), and black (K). Although the six colors used by printer 300 in printing are here cyan (C), magenta (M), yellow (Y), black (K), orange (O), and green (G), the colors used in printing are not limited to those colors. For example, red (R) and blue (B) may be used in place of orange (O) and green (G), or any other color may be used. Here, printer 300 is described as an example of an image formation apparatus capable of printing using six colors. However, the present invention is not limited thereto, and printer 300 may be any image formation apparatus capable of printing using four or more colors. The hardware configuration and functions of printer 300 are well known and therefore a description thereof will not be repeated here.

PC 200 is a general computer. A driver program for controlling each of MFP 100 and printer 300 is installed in PC 200. Thus, PC 200 allows an image of data to be printed on printer 300 and also to be printed on MFP 100. PC 200 also has a well-known image processing function and executes image processing on data.

A user can operate PC 200 to allow date to be printed on printer 300. At that time, PC 200 generates print data to be printed on printer 300 based on the data. On the other hand, a user may wish to allow MFP 100 to print an image of data so as to confirm the image formed on paper before being printed on printer 300. PC 200 stores an ICC profile that describes the color-related characteristic of printer 300 and sends the print data generated to be printed on printer 300 and the ICC profile of printer 300, to MFP 100. Here, printer 300 may generate and store print data based on data received from PC 200, and MFP 100 may receive and obtain the print data generated in printer 300 and the ICC profile of printer 300, from printer 300.

MFP 100 includes a scanner for scanning a document, an image formation apparatus for forming an image on a recording medium such as paper based on image data, and a facsimile machine, and is provided with an image scanning function, a copy function, and a facsimile transmission/reception function.

Figure 2:
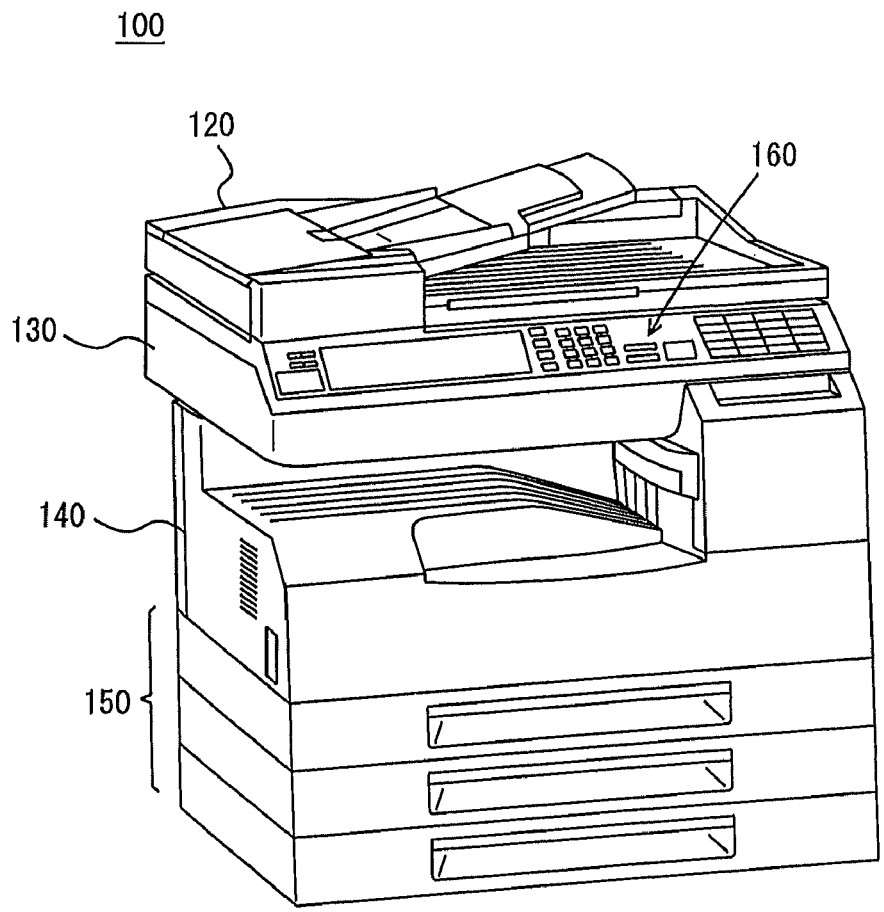
FIG. 2 is an external perspective view of MFP.

FIG. 2 is an external perspective view of MFP. FIG. 3 is a block diagram showing an exemplary hardware configuration of MFP. With reference to FIG. 2 and FIG. 3, MFP 100 includes a main circuit 110, a document scanning portion 130 for scanning a document, an automatic document feeder 120 for transferring a document to document scanning portion 130, an image formation portion 140 for forming a still image output by document scanning portion 130 scanning a document or an image of externally received print data, a paper-feeding portion 150 for supplying paper to image formation portion 140, and an operation panel 160 as a user interface.

Main circuit 110 includes a CPU (Central Processing Unit) 111 to control MFP 100 as a whole a communication interface (I/F) portion 112, a ROM (Read Only Memory) 113, a RAM (Random Access Memory) 114, an EEPROM (Electronically Erasable Programmable ROM) 115, a hard disk drive (HDD) 116 as a mass storage device, a facsimile portion 117, and a card interface (I/F) 118 to which a flash memory 118A is attached. CPU 111 is connected to automatic document feeder 120, document scanning portion 130, image formation portion 140, paper-feeding portion 150, and operation panel 160.

ROM 113 stores a program executed by CPU 111 or data necessary to execute the program. RAM 114 is used as a working area when CPU 111 executes a program. RAM 114 also temporarily stores still images successively sent from document scanning portion 130.

Operation panel 160 is provided on the top face of MFP 100 and includes a display portion 160A and an operation portion 160B. Display portion 160A is a display device such as a liquid crystal display (LCD), an organic ELD (Electroluminescence Display) and displays instruction menus for users, information concerning the obtained image data, and the like. Operation portion 160B includes a plurality of keys and accepts inputs of data such as instructions, characters, and numerals through the user's operations corresponding to the keys. Operation portion 160B further includes a touch-panel provided on display portion 160A.

Communication I/F portion 112 is an interface for connecting MFP 100 to network 2. CPU 111 communicates with printer 300 or PC 200 through communication I/F portion 112 to transmit/receive data. Communication I/F portion 112 can also communicate with a computer connected to the Internet via network 2.

Facsimile portion 117 is connected to a Public Switched Telephone Network (PSTN) to transmit facsimile data to PSTN or receive facsimile data from PSTN. Facsimile portion 117 stores the received facsimile data into HDD 116 or outputs the same to image formation portion 140. Image formation portion 140 prints the facsimile data received by facsimile portion 117 on a sheet of paper. In addition, facsimile portion 117 converts the data stored in HDD 116 into facsimile data and transmits the converted data to a facsimile machine connected to PSTN.

Flash memory 118A is attached to card I/F 118. CPU 111 can access flash memory 118A through card I/F 118. CPU 111 loads a program recorded on flash memory 118A attached to card I/F 118, into RAM 114 for execution. It is noted that the program executed by CPU 111 is not limited to a program recorded on flash memory 118A, and a program stored in HDD 116 may be loaded into RAM 114 for execution. In this case, another computer connected to network 2 may overwrite the program stored in HDD 116 of MFP 100 or may additionally write a new program. Furthermore, MFP 100 may download a program from another computer connected to network 2 and store the program into HDD 116. The program referred to herein includes not only a program directly executable by CPU 111 but also a source program, a compressed program, an encrypted program, and the like.

Figure 4:
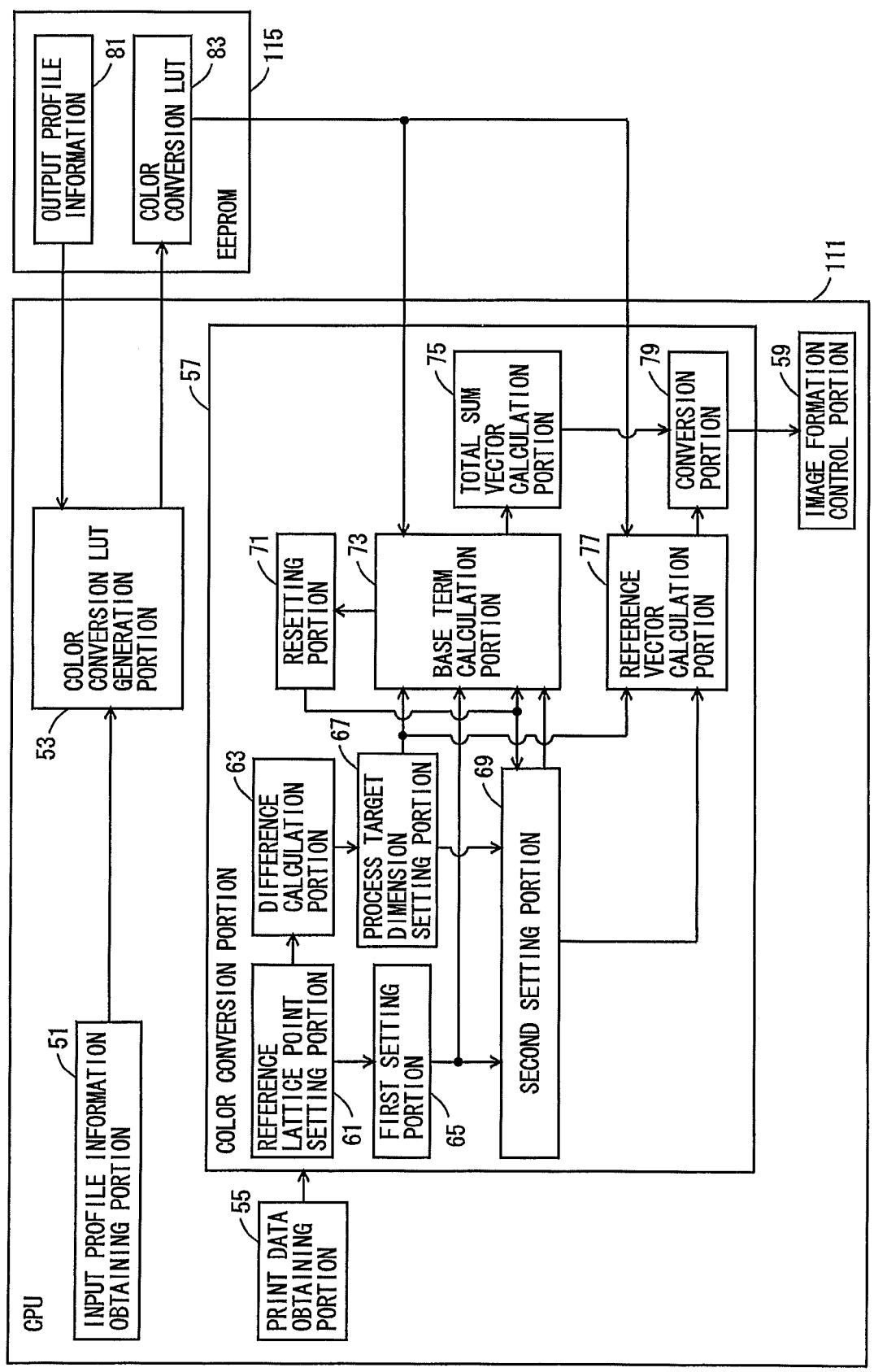
FIG. 4 is a functional block diagram showing an example of functions of MFP together with information stored in EEPROM.

FIG. 4 is a functional block diagram showing an example of functions of CPU included in MFP together with information stored in EEPROM. Referring to FIG. 4, CPU 111 included in MFP 100 includes an input profile information obtaining portion 51 obtaining an ICC profile of printer 300, a color conversion LUT generation portion 53 for generating a color conversion lookup table (LUT), a print data obtaining portion 55 obtaining print data to be printed on printer 300, a color conversion portion 57 for color-converting print data based on the color conversion LUT, and an image formation control portion 59 controlling image formation portion 140.

When communication I/F portion 112 receives the ICC profile of printer 300 from PC 200 or printer 300, input profile information obtaining portion 51 obtains that ICC profile. Input profile information obtaining portion 51 outputs the obtained ICC profile to color conversion LUT generation portion 53. The ICC profile obtained by input profile information obtaining portion 51 is the ICC profile of printer 300. The ICC profile of printer 300 includes a B-to-A tag which is a first conversion table for conversion from a profile connection space (PCS) that is a device-independent reference space, here, a L*a*b space, into a device space dependent on printer 300, here a CMYKOG color space, and an A-to-B tag which is a second conversion table for conversion from the device space (CMYKOG color space) into the reference space (L*a*b space).

The B-to-A tag included in the ICC profile of printer 300 is a table which maps lattice points (colors) in the device space of printer 300 respectively corresponding to all of a predetermined plurality of lattice points (colors) in the L*a*b space. A lattice point in the L*a*b space includes the respective values of L, *a, and *b which are three component colors. A lattice point in the device space of printer 300 includes, as M component colors, here, the respective six values of C, M, Y, K, O, and G.

The A-to-B tag included in the ICC profile of printer 300 is a table which associates the lattice points (colors) in the L*a*b space respectively with all of a predetermined plurality of lattice points (colors) in the device space of printer 300.

EEPROM 115 stores output profile information 81 beforehand. The output profile information includes the ICC profile of MFP 100. The ICC profile of MFP 100 includes a B-to-A tag which is a table for conversion from the reference space (L*a*b space) into the device space dependent on MFP 100, here, a CMYK color space, and an A-to-B tag which is a table for conversion from the device space (CMYK color space) into the reference space. The data format of the B-to-A tag and the A-to-B tag is the same as the data format of the B-to-A tag and the A-to-B tag included in the ICC profile of printer 300, and therefore a description thereof will not be repeated here.

Color conversion LUT generation portion 53 generates a color conversion LUT by referring to the A-to-B tag of the ICC profile of printer 300 and the B-to-A tag of the ICC profile of MFP 100 to associate a lattice point (color) in the device space of printer 300 with a corresponding lattice point (color) in the device space of MFP 100, in each of a plurality of lattice points defined by the A-to-B tag of the ICC profile of printer 300. Color conversion LUT generation portion 53 stores the generated color conversion LUT into EEPROM 115. Accordingly, color conversion LUT 83 is stored in EEPROM 115.

When communication I/F portion 112 receives print data from PC 200 or printer 300, print data obtaining portion 55 obtains that print data. Print data obtaining portion 55 outputs the obtained print data to color conversion portion 57. The print data obtained by print data obtaining portion 55 is the one generated for printer 300 and is the print data in the device space (CMYKOG color space) of printer 300.

Color conversion portion 57 receives the print data from print data obtaining portion 55 and refers to color conversion LUT 83 stored in EEPROM 115 to convert each of a plurality of pixels included in the print data from the device space of printer 300 into the device space of MFP 100. In the following, a description will be made to an example in which one of a plurality of pixels included in the print data is converted from the device space dependent on printer 300 into the device space of MFP 100. Here, a pixel in the device space of printer 300 that is included in the print data is referred to as first color data, and a pixel in the device space of MFP 100 that is produced by converting the first color data is referred to as second color data. Furthermore, the device space of printer 300 is of M dimensions (M is a positive integer), and the device space of MFP 100 is of N dimensions (N is a positive integer). Therefore, the first color data includes M elements respectively corresponding to M dimensions and is represented by a vector in the device space of printer 300. Similarly, the second color data includes N elements respectively corresponding to N dimensions and is represented by a vector in the device space of MFP 100. Here, the device space of printer 300 is of six dimensions of C, M, Y, K, O, and G, and the device space of MFP 100 is of four dimensions of C, M, Y, K.

Color conversion LUT 83 associates a plurality of lattice points in the device space of printer 300 with a plurality of lattice points in the device space of MFP 100. In some cases, however, the first color data which is a pixel included in the print data does not match a plurality of lattice points included in the device space of printer 300 and is located between a plurality of lattice points. Therefore, color conversion portion 57 calculates the second color data by interpolating a plurality of lattice points defined by color conversion LUT 83.

A method of calculating the second color data will be described below. The vector f(p) of the first color data is represented by the following expression (1).

$$f(p)=P_0\times(1-\Delta_1)+P_1\times(\Delta_1-\Delta_2)+\ldots+P_{M-1}\times(\Delta_{M-1}-\Delta_M)+P_M\times\Delta_M \quad (1)$$

The expression (1) above can be transformed into the following expression (2).

$$f(p)=P_0+\Delta_1\times(P_1-P_0)+\Delta_2\times(P_2-P_1)+\ldots\Delta_M\times(P_M-P_{M-1}) \quad (2)$$

Here, $P_0$-$P_M$ are the vectors showing a plurality of lattice points in the color space of printer 300 and each include M elements respectively corresponding to M dimensions. $P_0$-$P_M$ are lattice points that form the (M+1) vertexes of a super solid enclosing the first color data. $P_0$ represents that all of the included M elements are equal to or smaller than the values of M elements included in the first color data. Here, $P_0$ is referred to as a reference lattice point.

The differences $\Delta_1$-$\Delta_M$ are M elements of difference vector between the first color data and $P_0$, where $\Delta_1 > \Delta_2 > \ldots > \Delta_{M-1} > \Delta_M$. $P_1$-$P_M$ are determined by differences $\Delta_1$-$\Delta_M$. $P_1$ is a lattice point where all of the elements of the dimensions other than the dimension of difference $\Delta_1$ have values equal to the elements of the corresponding dimensions of reference lattice point $P_0$ and the element of the dimension of difference $\Delta_1$ has a value larger than the element of the corresponding dimension of reference lattice point $P_0$. Furthermore, $P_2$ is a lattice point where all of the elements of the dimensions other than the dimension of difference $\Delta_2$ have values equal to the elements of the corresponding dimensions of $P_1$ and the element of the dimension of difference $\Delta_2$ has a value larger than the element of the corresponding dimension of $P_1$. Similarly, $P_2$, $P_2$ ... $P_{M-1}P$ are determined, and $P_M$ is a lattice point where all of the elements of the dimensions other than the dimension of difference $\Delta_M$ have values equal to the elements of the corresponding dimensions of $P_{M-1}$ and the element of the dimension of difference $\Delta_M$ has a value larger than the element of the corresponding dimension of $P_{M-1}$.

Here, the expression (2) above will be described using the figure. Here, for the sake of brevity of illustration, it is assumed that M=3.

FIG. 5 is a diagram showing the relation between the first color data and the lattice points in the device space of the printer. Referring to FIG. 5, reference lattice point $P_0$ and $\Delta_1$-$\Delta_M$ are determined with respect to first color data 301, and $P_1$, $P_2$, and $P_3$ are determined based on $\Delta_1$, $\Delta_2$, and $\Delta_3$, respectively. When M=3, the following expression (3) can be derived from the expression (2).

$$f(p)=P_0+\Delta_1\times(P_1-P_0)+\Delta_2\times(P_2-P_1)+\Delta_3\times(P_3-P_2) \quad (3)$$

It can be understood that first color data 301 can be represented by lattice points $P_0$, $P_1$, $P_2$, $P_3$, $P_4$ of four vertexes of a triangular pyramid enclosing first color data 301, and four differences $\Delta_1$-$\Delta_4$, as represented by the expression (3).

In the color conversion expression (2) above, $P_1$-$P_M$ are substituted with the lattice points in the device space of MFP 100, which are related with $P_1$-$P_M$ in color conversion LUT 83, whereby the second color data in the device space of MFP 100 corresponding to the first color data can be calculated. However, in the expression (2), $P_1$-$P_M$ cannot be determined unless $\Delta_1$-$\Delta_M$ are sorted. Therefore, in order to calculate the second color data using the expression (2) above, a sorting process of sorting differences $\Delta_1$-$\Delta_M$ is necessary. MFP 100 in the present embodiment uses the expression (4) below obtained by converting the expression (2) above so as not to perform a sorting process.

$$f(p)=(1-\Delta_1)\times(P_0-P_1)+P_1+\Delta_2\times(P_2-P_1)+\Delta_3\times(P_3-P_2)+\ldots+\Delta_M\times(P_M-P_{M-1}) \quad (4)$$

When the first term $(1-\Delta_1)\times(P_0-P_1)$ of the expression (4) is represented as $R_1$, the expression (4) can be transformed into the following expression (5) using $R_1$.

$$f(p)=R_1+(1-\Delta_2)\times(P_1-P_2)+P_2+\Delta_3\times(P_3-P_2)+\Delta_4\times(P_4-P_3)+\ldots+\Delta_M\times(P_M-P_{M-1}) \quad (5)$$

The second term $(1-\Delta_2)\times(P_1-P_2)$ is replaced by $R_2$, and the expression (6) can be derived by replacing by $R_{M-3}$ in order, similarly.

$$f(p)=R_1+R_2+\ldots+R_{M-3}+P_{M-3}+\Delta_{M-2}\times(P_{M-2}-P_{M-3})+\Delta_{M-1}\times(P_{M-1}-P_{M-2})+\Delta_M\times(P_M-P_{M-1}) \quad (6)$$

where $1\leq t\leq M-3$.

$R_1$-$R_{M-3}$ are generalized using a variable t, as shown by the following expression (7).

$$R_t=(1-\Delta t)\times(P_{t-1}-P_t) \quad (7)$$

$R_1$ can be calculated since lattice point $P_1$ is determined from reference lattice point $P_0$ and difference $\Delta_1$. $R_t (1<t\leq M-3)$ can be calculated since lattice point $P_t$ is determined from lattice point $P_{t-1}$ and difference $\Delta_t$. Therefore, $R_1$-$R_{M-3}$ can be calculated without sorting $\Delta_1$-$\Delta_t$, by finding the largest values of $\Delta_1$-$\Delta_t$ in order.

Specifically, where vector $R_t$ is a vector in the device space of printer 300, the vector in the device space of MFP 100 can be calculated by substituting $P_{t-1}$ and $P_t$ with the values of lattice points $U_{t-1}$, $U_t$ in the device space of MFP 100, which are associated with $P_{t-1}$ and $P_t$ by color conversion LUT 83. Therefore, $\Delta_1$-$\Delta_M$ are selected in descending order, so that $T_t$ corresponding to $R_t$ is found, in order, from $T_t$ and $T_{t-1}$ respectively corresponding to $P_t$ determined by the selected $\Delta_t$ and $P_{t-1}$ determined by the previously selected $\Delta_{t-1}$. This eliminates the need for sorting $\Delta_1$-$\Delta_M$ in descending order.

The term of the expression (8) below which is included in the expression (6) is the same as the operational expression used in the three-dimensional triangular pyramid interpolation shown in the expression (2) above.

$$P_{M-3}+\Delta_{M-2}\times(P_{M-2}-P_{M-3})+\Delta_{M-1}\times(P_{M-1}-P_{M-2})+\Delta_M\times(P_M-P_{M-1}) \quad (8)$$

Hardware or software for executing the operational expression shown by the expression (8) corresponds to existing hardware or program included in MFP 100 for processing image data of RGB color system as usually used. Therefore, the vector in the device space of MFP 100 can be calculated by substituting four lattice points $P_{M-3}$, $P_{M-2}$, $P_{M-1}$, $P_M$ in the expression (8) with the values of lattice points $U_{M-3}$, $U_{M-2}$, $U_{M-1}$, $U_M$ in the device space of MFP 100, which are associated with $P_{M-3}$, $P_{M-2}$, $P_{M-1}$, $P_M$ by color conversion LUT 83. Therefore, the vector can be calculated by providing existing hardware or program with lattice points $U_{M-3}$, $U_{M-2}$, $U_{M-1}$, $U_M$ respectively corresponding to four lattice points $P_{M-3}$, $P_{M-2}$, $P_{M-1}$, $P_M$ and three differences $\Delta_{M-2}$, $\Delta_{M-1}$, $\Delta_M$.

MFP 100 in the present embodiment calculates the second color data by finding vectors $T_1$-$T_{M-L}$ corresponding to $R_1$-$R_{M-L}$ in order and finding the remaining term shown in the expression (8) using the existing program. Here, $R_t$ is referred to as a base term of the t-th dimension, $P_{t-1}$ is referred to as a first process target lattice point of the t-th dimension, and $P_t$ is referred to as a second process target lattice point of the t-th dimension.

Returning to FIG. 4, color conversion portion 57 includes a reference lattice point setting portion 61 extracting a reference lattice point corresponding to the first color data, a difference calculation portion 63 calculating the difference between the first color data and the reference lattice point, a first setting portion 65 setting a first process target lattice point serving as a basis for calculating the base term, a process target dimension setting portion 67 setting a process target dimension, a second setting portion 69 setting a second process target lattice point, a base term calculation portion 73 calculating the base term, a total sum vector calculation portion 75 calculating the total sum of the base terms, a resetting portion 71 resetting the first process target lattice point, a reference vector calculation portion 77 calculating the reference vector, and a conversion portion 79 calculating the second color data from the reference vector and the total sum vector.

Reference lattice point setting portion 61 extracts a lattice point where all of the respective M elements of M dimensions are equal to or smaller than the elements of the corresponding dimensions of the first color data, of a plurality of lattice points in the device space of printer 300 defined by color conversion LUT 83 stored in EEPROM 115, and reference lattice point setting portion 61 then sets the extracted lattice point as a reference lattice point. In the present embodiment, the lattice point defined by color conversion LUT 83 has an upper-order bit and a lower-order bit, and the lower-order bit is zero. Therefore, reference lattice point setting portion 61 extracts a lattice point having an upper-order bit equal to the first color data and having a lower-order bit of zero, and reference lattice point setting portion 61 then sets the extracted lattice point as a reference lattice point. Reference lattice point setting portion 61 outputs the reference lattice point to first setting portion 65 and difference calculation portion 63.

Difference calculation portion 63 calculates the differences between the respective M elements of M dimensions of the first color data and the elements of the corresponding dimensions of the reference lattice point. Specifically, the respective lower-order bits of M elements of M dimensions of the first color data are set as differences. Difference calculation portion 63 outputs the calculated respective differences of M dimensions to process target dimension setting portion 67.

Process target dimension setting portion 67 sets a dimension to be processed, of M dimensions, as a process target dimension. Specifically, the dimension having the largest difference of the differences of the dimensions that have not been set as process targets of M dimensions is set as a process target dimension. Process target dimension setting portion 67 outputs the process target dimension and the difference of that dimension to second setting portion 69 and base term calculation portion 73. Process target dimension setting portion 67 extracts M differences in descending order and sets the dimension having the extracted difference as a process target dimension, every time the base term is calculated by base term calculation portion 73 described later.

Furthermore, when the number of dimensions not set as process target dimensions of M dimensions becomes a predetermined number L, here, L=3, process target dimension extraction portion 67 outputs three dimensions that are not set as process target dimensions, of the respective M elements of M dimensions, and three differences corresponding to those, to reference vector calculation portion 77.

In order to select the largest value of M differences in order for calculating the (M−L) base terms, only a comparison process has to be performed, and the number of comparison steps is M×(M−1)/2−L×(L−1)/2. By contrast, in order to sort M differences, a loop determination process and a comparison process have to be performed, where the number of loop determination steps is M×(M+1)/2 and the number of comparison steps is M×(M−1)/2. Accordingly, the number of steps for the operation can be decreased by the amount of M×(M+1)/2+L×(L−1)/2 as compared with the case where a sorting process is performed, thereby increasing the processing speed.

Second setting portion 69 receives the first process target lattice point from first setting portion 65 or resetting portion 71, and receives a process target dimension and a difference corresponding thereto from process target dimension setting portion 67. The first process target lattice point (reference lattice point) set before calculation of the base term by base term calculation portion 73 as described later is received from first setting portion 65, and the first process target lattice point is received from resetting portion 71 after calculation of the base term by base term calculation portion 73.

Of a plurality of lattice points in the device space of printer 300 as defined by color conversion LUT 83, second setting portion 69 sets, as a second process target lattice point, a lattice point where all the elements of the dimensions other than the process target dimension of M dimensions are equal to the elements of the corresponding dimensions of the first process target lattice point and the element of the process target dimension is larger than the element of the corresponding dimension of the first process target lattice point. Second setting portion 69 outputs the second process target lattice point to base term calculation portion 73 until the number of dimensions not set as the process target dimensions of M dimensions becomes a predetermined number, here L=3, and second setting portion 69 then outputs the second process target lattice point to reference vector calculation portion 77 when the number of dimensions not set as process target dimensions becomes L (=3).

Base term calculation portion 73 calculates a partial vector $T_t$ in the device space of MFP 100, which corresponds to partial vector $R_t$ in the device space of printer 300, based on the difference of the process target dimension, the first process target lattice point, and the second process target lattice point, and then outputs partial vector $T_t$ to total sum vector calculation portion 75. Specifically, $T_t$ is calculated by substituting vectors $P_t$ and $P_{t-1}$ of the lattice points in the expression (7) above with lattice points $U_t$ and $U_{t-1}$ in the device space of MFP 100, which are associated with $P_t$ and $P_{t-1}$ by color conversion LUT 83.

Total sum vector calculation portion 75 calculates a total sum vector S by integrating partial vectors $T_t$ input from base term calculation portion 73 and outputs total sum vector S to conversion portion 79. Total sum vector S is a vector in the device space of MFP 100.

When partial vector $T_t$ is calculated by base term calculation portion 73, resetting portion 71 sets the second process target lattice point as a new first process target lattice point and outputs the new first process target lattice point to second setting portion 69 and base term calculation portion 73. Resetting portion 71 sets the second process target lattice point as a new first process target lattice point until the number of dimensions that have not been set as process target dimensions of M elements of M dimensions becomes a predetermined number (L+1), here L+1=4.

After the process target dimension is set until the number of dimensions not set as process target dimensions of M elements of M dimensions becomes a predetermined number L, here, L=3, and a second process target lattice point corresponding to the (M−L)th, here, third process target dimension is set, reference vector calculation portion 77 determines a first reference vector defined by a predetermined operational expression, based on the second process target lattice point, the respective differences of L unprocessed dimensions and L lattice points respectively corresponding to L unprocessed dimensions. Then, a second reference vector in the device space of MFP 100 corresponding to the first reference vector is calculated using color conversion LUT 83. Specifically, a second reference vector is calculated by executing the existing program and providing the existing hardware or program with the values of lattice points $U_{M-3}$, $U_{M-2}$, $U_{M-1}$, $U_M$ in the device space of MFP 100, which are associated by color conversion LUT 83 with four lattice points $P_{M-3}$, $P_{M-2}$, $P_{M-1}$, $P_M$ in the operational expression shown by the expression (8) above, in place of those lattice points, and with the respective differences $\Delta_{M-2}$, $\Delta_{M-1}$, $\Delta_M$ of the three unprocessed dimensions. Reference vector calculation portion 77 outputs the second reference vector to conversion portion 79.

Conversion portion 79 adds the second reference vector input from reference vector calculation portion 77 to total sum vector S input from total sum vector calculation portion 75, sets the resulting vector as second color data, calculates the second color data corresponding to the first color data corresponding to each of all the pixels included in print data, and then outputs the print data formed of pixels of the second color data to image formation control portion 59.

Image formation control portion 59 outputs the print data input from color conversion portion 57 to image formation portion 140 to allow image formation portion 140 to form an image according to the print data.

Figure 6:
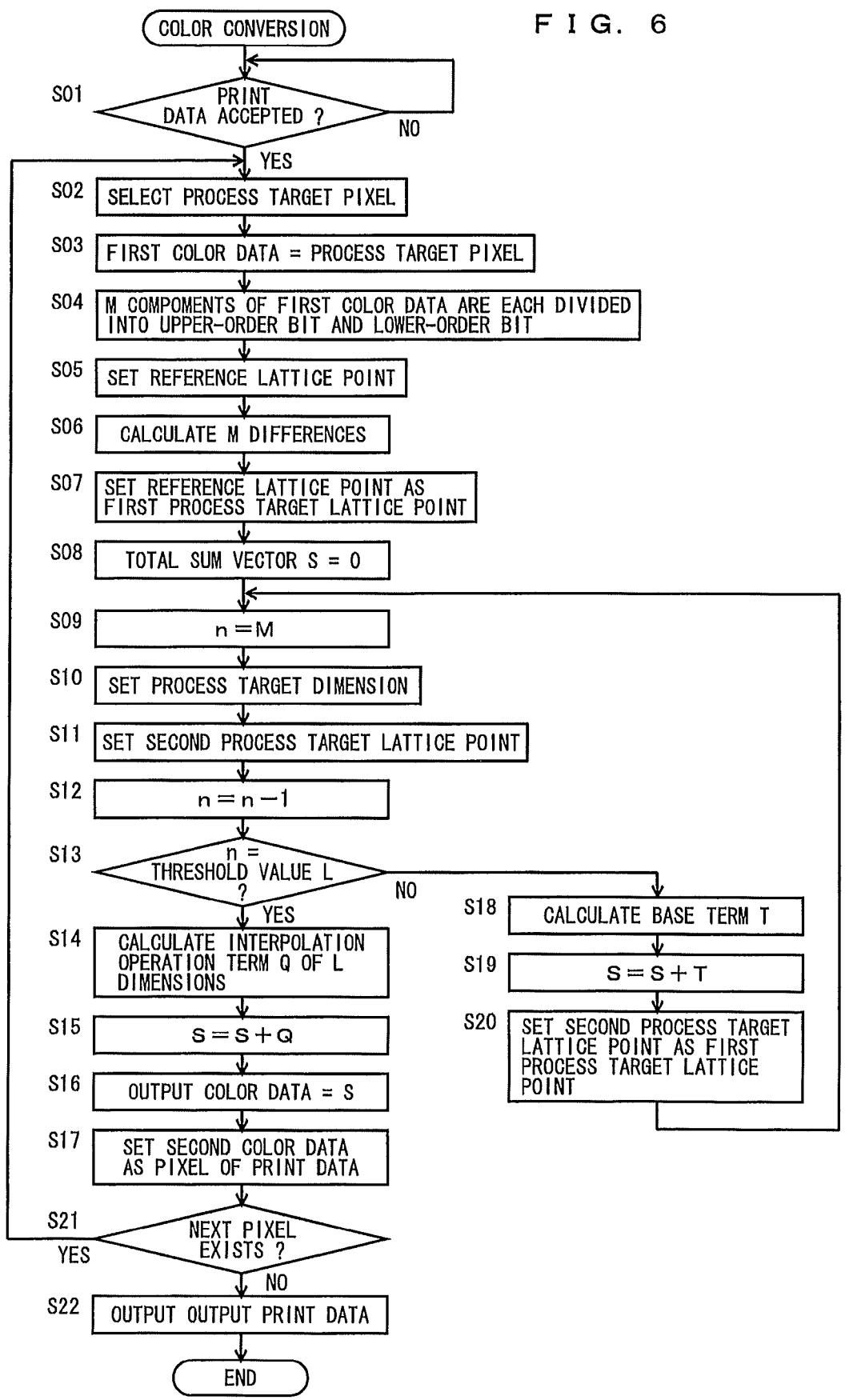
FIG. 6 is a flowchart showing an exemplary flow of a color conversion process.

FIG. 6 is a flowchart showing an exemplary flow of a color conversion process. The color conversion process is a process executed by CPU 111 by CPU 111 of MFP 100 executing a color conversion program. Referring to FIG. 6, CPU 111 determines whether or not print data is accepted. CPU 111 is on standby until print data is accepted (NO in step S01), and if print data is accepted (YES in step S01), the process proceeds to step S02.

In step S02, one of a plurality of pixels included in the print data is selected as a process target pixel. In the next step S03, the value of the process target pixel selected in step S02 is set as first color data. Then, in the next step S04, each of M elements of M dimensions of the first color data is divided into an upper-order bit and a lower-order bit. Then, a lattice point where each of the included M elements has an upper-order bit equal to the first color data and a lower-order bit of zero is set as a reference lattice point.

In the next step S06, the difference between the first color data and the reference lattice point is calculated. Specifically, the differences between the respective M elements of M dimensions of the first color data and the elements of the corresponding dimensions of the reference color data are calculated. Accordingly, the respective M differences of M dimensions are calculated. Here, the lower-order bits of the respective M elements of M dimensions of the color data are assumed as differences.

In the next step S07, the reference lattice point is set as a first process target lattice point. Then, total sum vector S is set to "0" (step S08). This is to initialize total sum vector S to "0." In the next step S09, the number of dimensions M of the device space of printer 300 is set as variable n. Here, the number of dimensions M of the device space of printer 300 is 6. Variable n is a variable for counting the dimensions not set as process target dimensions.

In the next step S10, a process target dimension is set. Specifically, the largest element is extracted among from the elements of the dimensions that have not yet been set as process target dimensions of the respective M elements of M dimensions of the first color data, and the dimension of the largest element is set as a process target dimension.

In the next step S11, a second process target lattice point is set. Specifically, of a plurality of lattice points in the device space of printer 300 defined by color conversion LUT 83, a lattice point where all the elements of the dimensions other than the process target dimension are equal to the elements of the corresponding dimensions of the first process target lattice point and the element of the process target dimension is larger than the element of the corresponding dimension of the first process target lattice point is set as a second process target lattice point.

In the next step S12, variable n is set to a value obtained by subtracting one from variable n. Then, it is determined whether or not variable n is equal to a threshold value L (step S13). Threshold value L is a value predetermined to use the expression (8) above in the aforementioned existing hardware or program, and is three, here. If variable n is equal to threshold value L, the process proceeds to step S14. Otherwise, the process proceeds to step S18. In step S18, base term $T_t$ is calculated using the expression (7) above. Here, t=M−n. Base term $T_t$ is vector $T_t$ in the device space of MFP 100 corresponding to vector $R_t$ in the device space of printer 300. Vector $R_t$ is a vector which has the first process target lattice point as a starting point and is directed toward the second process target lattice point in the device space of printer 300 and whose scholar quantity is expressed by $(1-\Delta d_t)$ where $\Delta_t$ is the difference of the process target dimension set in step S10. Therefore, $T_t$ is calculated by substituting vectors $P_t$ and $P_{t-1}$ of the lattice points in the expression (7) above with lattice points $U_t$ and $U_{t-1}$ in the device space of MFP 100 which are associated with $P_t$ and $P_{t-1}$ by color conversion LUT 83.

In the next step S19, total sum vector S is set to a value obtained by adding thereto the vector of base term $T_t$ calculated in step S18. Then, in the next step S20, the lattice point set as the second process target lattice point in step S11 is set as a new first process target lattice point, and the process returns to step S09. Step S18-step S20 are repeatedly executed until variable n becomes equal to threshold value L, so that total sum vector S, which is a total sum of respective base terms $T_M$-$T_{M-L}$ of the M-th to (M−L)th dimensions, is calculated.

On the other hand, in step S14, interpolation operation term Q of L dimensions is calculated. Interpolation operation term Q of L dimensions is calculated according to a predetermined operational expression. Specifically, L lattice points respectively corresponding to L dimensions that have not yet been set as process targets in step S10 of the respective M elements of M dimensions of the first color data are determined. Then, L elements respectively corresponding to L dimensions not yet set as process targets are sorted in descending order. Here, L=3, and assuming that three elements are the first element, the second element, and the third element in descending order, and the dimensions corresponding to them are the first dimension, the second dimension, and the third dimension, a method of determining the first lattice point, the second lattice point, and the third lattice point respectively corresponding to the first to third dimensions will be described.

The first lattice point is a lattice point where the element of a dimension other than the first dimension is equal to the corresponding element of the second process target lattice point and the element of the first dimension is larger than the corresponding element of the second process target lattice point, of a plurality of lattice points in the device space of printer 300 defined by color conversion LUT 83. The second lattice point is a lattice point where the element of a dimension other than the second dimension is equal to the corresponding element of the first lattice point and the element of the second dimension is larger than the corresponding element of the first lattice point, of a plurality of lattice points in the device space of printer 300 defined by color conversion LUT 83. The third lattice point is a lattice point where the element of a dimension other than the third dimension is equal to the corresponding element of the second lattice point and the element of the third dimension is larger than the corresponding element of the second lattice point, of a plurality of lattice points in the device space of printer 300 defined by color conversion LUT 83.

Interpolation operation term Q is calculated using the expression (8) above from the second process target lattice point, the first lattice point, the second lattice point, and the third lattice point as well as the difference of the first dimension, the difference of the second dimension, and the difference of the third dimension in the device space of printer 300.

Interpolation operation term Q, which is a vector in the device space of MFP 100, is calculated by substituting vectors $P_{M-3}$, $P_{M-2}$, $P_{M-1}$, and $P_M$ of the lattice points of the expression (8) above with lattice points $U_{M-3}$, $U_{M-2}$, $U_{M-1}$, and $U_M$ in the device space of MFP 100, which are associated with $P_{M-3}$, $P_{M-2}$, $P_{M-1}$, and $P_M$ by color conversion LUT 83.

In the next step S15, total sum vector S is set to a value obtained by adding thereto interpolation operation term Q, and the process proceeds to step S16.

In step S16, total sum vector S is set as the second color data. Then, the print data is updated by replacing the second color data with the process target pixel selected in step S02. In step S21, it is determined whether or not a pixel that has not yet been selected as a process target exists in a plurality of pixels included in the print data accepted in step S01. If such a pixel exists, the process returns to step S02, and if not, the process proceeds to step S22. In step S22, the print data is output to image formation portion 140, and the process then ends.

As described above, MFP 100 in the present embodiment set as a reference lattice point a lattice point where M elements are each equal to or smaller than M elements of the first color data, of a plurality of lattice points in the device space (the first color space) of printer 300 defined by color conversion LUT 83, calculates, for each of M elements of the first color data, the difference from the element of the corresponding dimension of the reference lattice point, and sets the reference lattice point as the first process target lattice point. Then, the dimension having the largest difference of the differences of the dimensions not set as process targets of M dimensions is set as a process target dimension. Then, of a plurality of lattice points in the device space of printer 300 defined by color conversion LUT 83, a lattice point where the element of a dimension other than the process target dimension is equal to the first process target lattice point and the element of the process target dimension is larger than the first process target lattice point is set as a second process target lattice point. Then, a base term (partial vector) in the second color space is calculated based on the difference of the process target dimension, the first process target lattice point, and the second process target lattice point. Until a predetermined number (M−L) of base terms are calculated, the second process target lattice point is reset as a first process target lattice point, and the total sum vector is calculated by adding up partial vectors every time a partial vector is calculated. The process target dimension is set until the number of dimensions not set as process target dimensions becomes equal to L. After the second process target lattice point corresponding to the dimension set as the (M−L)th process target dimension is set, the second reference vector in the device space of MFP 100 (the second color space) corresponding to the first reference vector determined by a predetermined operational expression is calculated using color conversion LUT 83 based on the second process target lattice point, the differences of L dimensions, and L lattice points determined by the differences of L dimensions. The second color data is calculated by adding the reference vector and the sum of total sum vectors.

Therefore, it is possible to utilize existing hardware or program using color conversion LUT 83 for calculating the second reference vector in the second color space corresponding to the first reference vector determined by a predetermined operational expression, based on the differences of L dimensions and L lattice points determined by the differences of L dimensions. In addition, there is no need to sort M differences, thereby decreasing the number of operations and thus increasing the processing speed.

In the embodiment as described above, the existing hardware or program of MFP 100 executes the operational expression in the expression (8) for processing image data of RGB color system, by way of example. However, in a case where MFP 100 includes existing hardware or program for processing image data of CMYK color system, that existing hardware or program executes an operational expression in the following expression (9).

$$P_{M-4}+\Delta_{M-3}\times(P_{M-3}-P_{M-4})+\Delta_{M-2}\times(P_{M-2}-P_{M-3})+\Delta_{M-1}\times(P_{M-1}-P_{M-2})+\Delta_{M}\times(P_{M}-P_{M-1}) \quad (9)$$

Furthermore, in step S13 of FIG. 7, it is determined whether or not variable n is equal to threshold value L. However, in the case where the existing hardware or program executes the operational expression in the expression (9), threshold value L is a value predetermined for the above-noted existing hardware or program to execute the operational expression in the expression (9) above, and threshold value L=4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
a storage portion to store a lookup table for converting first color data in a first color space having M dimensions (M is a positive integer) into second color data in a second color space having N dimensions (N is a positive integer);
a reference lattice point setting portion to set, as a reference lattice point, a lattice point where M elements are each equal to or smaller than M elements of said first color data, of a plurality of lattice points in said first color space defined by said lookup table;
a difference calculation portion to calculate, for each of M elements of said first color data, a difference from an element of a corresponding dimension of said reference lattice point, and to output a difference for each of M dimensions;
a first setting portion to set said reference lattice point as a first process target lattice point;
a process target dimension setting portion to set, as a process target dimension, a dimension having a largest difference of differences of dimensions not set as process targets of M dimensions;
a second setting portion to set, as a second process target lattice point, a lattice point where an element of a dimension other than said process target dimension is equal to said first process target lattice point and the element of said process target dimension is larger than said first process target lattice point, of a plurality of lattice points in said first color space defined by said lookup table;
a base term calculation portion to calculate a partial vector in said second color space, based on the difference of said process target dimension, said first process target lattice point, and said second process target lattice point;
a resetting portion to reset said second process target lattice point as said first process target lattice point until a predetermined number (M−L) (L is a positive integer) of said partial vectors are calculated;
a total sum vector calculation portion to calculate a total sum vector by adding up said partial vectors every time said partial vector is calculated;
a reference vector calculation portion to calculate a second reference vector in said second color space corresponding to a first reference vector determined by a predetermined operational expression, using said lookup table, based on said second process target lattice point, differences of L dimensions, and L lattice points determined by said differences of L dimensions, after said process target dimension is set until the number of dimensions not set as said process target dimension by said process target dimension setting portion becomes L, and said second process target lattice point corresponding to a dimension set as the (M−L)th process target dimension by said second setting portion is set; and
a conversion portion to calculate said second color data by adding said reference vector and a sum of said total sum vectors.

2. The image formation apparatus according to claim 1, wherein said base term calculation portion includes
a first partial vector calculation portion to calculate a first partial vector by multiplying a vector having said second process target lattice point as a starting point and said first process target lattice point as an end point, by a value obtained by subtracting the element of said process target dimension from a lattice point distance of said first color space, and
a second partial vector calculation portion to calculate a second partial vector in said second color space corresponding to said first partial vector, as said partial vector, using said lookup table.

3. The image formation apparatus according to claim 1, wherein L=3, and said predetermined operational expression is:

$$P_{M-3}+\Delta_{M-2}\times(P_{M-2}-P_{M-3})+\Delta_{M-1}\times(P_{M-1}-P_{M-2})+\Delta_{M}\times(P_{M}-P_{M-1})$$

where $P_{M-3}$ is said second process target lattice point corresponding to the dimension set as the (M−L)th process target dimension by said second setting portion,
$P_{M-2}, P_{M-1}, P_M$ are L lattice points in the first color space for dimensions not set as said process target dimension by said process target dimension setting portion, and $\Delta_{M-2}$, $\Delta_{M-1}$, $\Delta_M$ are differences between $P_{M-2}$, $P_{M-1}$, $P_M$ and the elements of the corresponding dimensions of said reference lattice point, and $\Delta_{M-2} > \Delta_{M-1} > \Delta_M$.

4. The image formation apparatus according to claim 1, wherein L=4, and said predetermined operational expression is:

$$P_{M-4} + \Delta_{M-3} \times (P_{M-3} - P_{M-4}) + \Delta_{M-2} \times (P_{M-2} - P_{M-3}) + \Delta_{M-1} \times (P_{M-1} - P_{M-2}) + \Delta_M \times (P_M - P_{M-1})$$

where $P_{M-4}$ is said second process target lattice point corresponding to the dimension set as the (M−L)th process target dimension by said second setting portion, $P_{M-3}$, $P_{M-2}$, $P_{M-1}$, $P_M$ are L lattice points in the first color space for dimensions not set as said process target dimension by said process target dimension setting portion, and $\Delta_{M-3}$, $\Delta_{M-2}$, $\Delta_{M-1}$, $\Delta_M$ are differences between $P_{M-3}$, $P_{M-2}$, $P_{M-1}$, $P_M$ and the elements of the corresponding dimensions of said reference lattice point, and $\Delta_{M-3} > \Delta_{M-2} > \Delta_{M-1} > \Delta_M$.

5. A color conversion program embodied on a non-transitory computer readable medium for allowing an image formation apparatus to execute the steps of:

setting, as a reference lattice point, a lattice point where M elements are each equal to or smaller than M elements of first color data, of a plurality of lattice points in a first color space defined by a lookup table for converting said first color data in said first color space having M dimensions (M is a positive integer) into second color data in a second color space having N dimensions (N is a positive integer);

calculating, for each of M elements of said first color data, a difference from an element of a corresponding dimension of said reference lattice point, and outputting a difference for each of M dimensions;

setting said reference lattice point as a first process target lattice point;

setting, as a process target dimension, a dimension having a largest difference of differences of dimensions not set as process targets of M dimensions;

setting, as a second process target lattice point, a lattice point where an element of a dimension other than said process target dimension is equal to said first process target lattice point and an element of said process target dimension is larger than said first process target lattice point, of a plurality of lattice points in said first color space defined by said lookup table;

calculating a partial vector in said second color space, based on the difference of said process target dimension, said first process target lattice point, and said second process target lattice point;

resetting said second process target lattice point as said first process target lattice point until a predetermined number (M−L) (L is a positive integer) of said partial vectors are calculated;

calculating a total sum vector by adding up said partial vectors every time said partial vector is calculated;

calculating a second reference vector in said second color space corresponding to a first reference vector determined by a predetermined operational expression, using said lookup table, based on said second process target lattice point, differences of L dimensions, and L lattice points determined by said differences of L dimensions, after said process target dimension is set until the number of dimensions not set as said process target dimension becomes L, and said second process target lattice point corresponding to a dimension set as the (M−L)th process target dimension is set; and calculating said second color data by adding said reference vector and a sum of said total sum vectors.

6. The color conversion program according to claim 5, wherein said step of calculating a partial vector includes the steps of:

calculating a first partial vector by multiplying a vector having said second process target lattice point as a starting point and said first process target lattice point as an end point, by a value obtained by subtracting the element of said process target dimension from a lattice point distance of said first color space, and calculating a second partial vector in said second color space corresponding to said first partial vector, as said partial vector, using said lookup table.

7. The color conversion program according to claim 5, wherein L=3, and said predetermined operational expression is:

$$P_{M-3} + \Delta_{M-2} \times (P_{M-2} - P_{M-3}) + \Delta_{M-1} \times (P_{M-1} - P_{M-2}) + \Delta_M \times (P_M - P_{M-1})$$

where $P_{M-3}$ is said second process target lattice point corresponding to the dimension set as the (M−L)th process target dimension, $P_{M-2}$, $P_{M-1}$, $P_M$ are L lattice points in the first color space for dimensions not set as said process target dimension, and $\Delta_{M-2}$, $\Delta_{M-1}$, $\Delta_M$ are differences between $P_{M-2}$, $P_{M-1}$, $P_M$ and the elements of the corresponding dimensions of said reference lattice point, and $\Delta_{M-2} > \Delta_{M-1} > \Delta_M$.

8. The color conversion program according to claim 5, wherein L=4, and said predetermined operational expression is:

$$P_{M-4} + \Delta_{M-3} \times (P_{M-3} - P_{M-4}) + \Delta_{M-2} \times (P_{M-2} - P_{M-3}) + \Delta_{M-1} \times (P_{M-1} - P_{M-2}) + \Delta_M \times (P_M - P_{M-1})$$

where $P_{M-4}$ is said second process target lattice point corresponding to the dimension set as the (M−L)th process target dimension, $P_{M-3}$, $P_{M-2}$, $P_{M-1}$, $P_M$ are L lattice points in the first color space for dimensions not set as said process target dimension, and $\Delta_{M-3}$, $\Delta_{M-2}$, $\Delta_{M-1}$, $\Delta_M$ are differences between $P_{M-3}$, $P_{M-2}$, $P_{M-1}$, $P_M$ and the elements of the corresponding dimensions of said reference lattice point, and $\Delta_{M-3} > \Delta_{M-2} > \Delta_{M-1} > \Delta_M$.

9. A color conversion method comprising the steps of:

setting, as a reference lattice point, a lattice point where M elements are each equal to or smaller than M elements of first color data, of a plurality of lattice points in a first color space defined by a lookup table for converting said first color data in said first color space having M dimensions (M is a positive integer) into second color data in a second color space having N dimensions (N is a positive integer);

calculating, for each of M elements of said first color data, a difference from an element of a corresponding dimension of said reference lattice point, and outputting a difference for each of M dimensions;

setting said reference lattice point as a first process target lattice point;

setting, as a process target dimension, a dimension having a largest difference of differences of dimensions not set as process targets of M dimensions;

setting, as a second process target lattice point, a lattice point where an element of a dimension other than said process target dimension is equal to said first process target lattice point and an element of said process target dimension is larger than said first process target lattice point, of a plurality of lattice points in said first color space defined by said lookup table;

calculating a partial vector in said second color space, based on the difference of said process target dimension, said first process target lattice point, and said second process target lattice point;

resetting said second process target lattice point as said first process target lattice point until a predetermined number (M−L) (L is a positive integer) of said partial vectors are calculated;

calculating a total sum vector by adding up said partial vectors every time said partial vector is calculated;

calculating a second reference vector in said second color space corresponding to a first reference vector determined by a predetermined operational expression, using said lookup table, based on said second process target lattice point, differences of L dimensions, and L lattice points determined by said differences of L dimensions, after said process target dimension is set until the number of dimensions not set as said process target dimension becomes L, and said second process target lattice point corresponding to a dimension set as the (M−L)th process target dimension is set; and calculating said second color data by adding said reference vector and a sum of said total sum vectors.

10. The color conversion method according to claim 9, wherein said step of calculating a partial vector includes the steps of:

calculating a first partial vector by multiplying a vector having said second process target lattice point as a starting point and said first process target lattice point as an end point, by a value obtained by subtracting the element of said process target dimension from a lattice point distance of said first color space, and calculating a second partial vector in said second color space corresponding to said first partial vector, as said partial vector, using said lookup table.

11. The color conversion method according to claim 9, wherein L=3, and said predetermined operational expression is:

$$P_{M-3}+\Delta_{M-2}\times(P_{M-2}-P_{M-3})+\Delta_{M-1}\times(P_{M-1}-P_{M-2})+\Delta_{M}\times(P_{M}-P_{M-1})$$

where $P_{M-3}$ is said second process target lattice point corresponding to the dimension set as the (M−L)th process target dimension, $P_{M-2}, P_{M-1}, P_M$ are L lattice points in the first color space for dimensions not set as said process target dimension, and $\Delta_{M-2}, \Delta_{M-1}, \Delta_M$ are differences between $P_{M-2}, P_{M-1}, P_M$ and the elements of the corresponding dimensions of said reference lattice point, and $\Delta_{M-2}>\Delta_{M-1}>\Delta_M$.

12. The color conversion method according to claim 9, wherein L=4, and said predetermined operational expression is:

$$P_{M-4}+\Delta_{M-3}\times(P_{M-3}-P_{M-4})+\Delta_{M-2}\times(P_{M-2}-P_{M-3})+\Delta_{M-1}\times(P_{M-1}-P_{M-2})+\Delta_{M}\times(P_{M}-P_{M-1})$$

where $P_{M-4}$ is said second process target lattice point corresponding to the dimension set as the (M−L)th process target dimension, $P_{M-3}, P_{M-2}, P_{M-1}, P_M$ are L lattice points in the first color space for dimensions not set as said process target dimension, and $\Delta_{M-3}, \Delta_{M-2}, \Delta_{M-1}, \Delta_M$ are differences between $P_{M-3}, P_{M-2}, P_{M-1}, P_M$ and the elements of the corresponding dimensions of said reference lattice point, and $\Delta_{M-3}>\Delta_{M-2}>\Delta_{M-1}>\Delta_M$.

* * * * *